Aug. 7, 1956     O. B. SANGSTER     2,757,896
SLIDING GATE VALVE

Filed Nov. 26, 1951     2 Sheets-Sheet 1

Olin B. Sangster
INVENTOR.

BY
Attorneys

Aug. 7, 1956

O. B. SANGSTER 2,757,896

SLIDING GATE VALVE

Filed Nov. 26, 1951

Olin B. Sangster
INVENTOR.

BY *[signature]*
Attorneys

United States Patent Office 2,757,896
Patented Aug. 7, 1956

2,757,896

SLIDING GATE VALVE

Olin B. Sangster, Earlsboro, Okla.

Application November 26, 1951, Serial No. 258,194

8 Claims. (Cl. 251—176)

This invention comprises novel and useful improvements in a sliding gate valve and more specifically relates to a valve installation of a sliding gate type having improved means cooperable with a valve seat means together with improved actuating means for the valve and packing and sealing means for the same.

The primary object of this invention is to provide a sliding gate valve assembly having an improved cooperating valve and seat construction wherein the valve members will be yieldingly urged and will self-adjust themselves to their valve seats in an improved manner and wherein the valve members will function to clean deposits and obstructions from the valve seats.

A further object of the invention is to provide a sliding gate valve assembly wherein the valve members are yieldingly urged to seating position upon a valve seat to facilitate their seating engagement.

Yet another important object of the invention is to provide a sliding gate valve construction having improved packing means for the valve stem together with scraper means for preventing deposits upon the valve stem and an auxiliary packing and sealing member carried by the valve stem and cooperating with the scraping means upon the packing.

A still further important object of the invention is to provide an improved stuffing box construction for a sliding gate type of valve which shall have improved stuffing box packing adjusting means therein.

Yet another important object of the invention is to provide an improved sliding gate valve construction of the character above mentioned wherein the actuating member for the valve shall be journaled in a bonnet, and wherein lubricating means are provided within the bonnet for lubricating the sliding engagement of the valve stem through the packing means and stuffing box construction, and cooperating therewith in an improved manner.

These, together with various ancillary objects and features of the invention, which will later become apparent as the following description proceeds, are attained by the present invention, a preferred embodiment of which has been illustrated, by way of example only, in the accompanying drawings, wherein.

Figure 1:
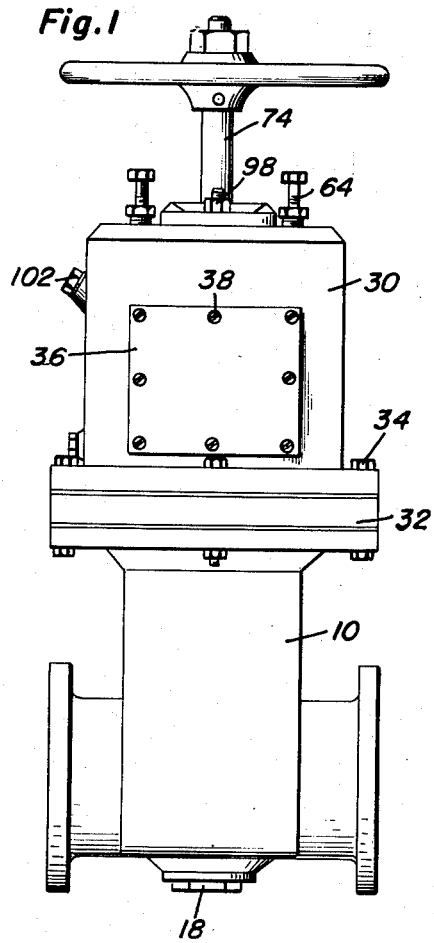
Figure 1 is an elevational view of a slide gate valve and incorporating therein the principles of this invention.

Referring now more specifically to the accompanying drawings, wherein like numerals designate similar parts throughout the various views, it will be seen that the numeral 10 indicates a valve body having aligned passageways 12 and 14 which are adapted to be placed in communication with each other by the valve mechanism set forth hereinafter, these passageways adapted to be placed in communication by the valve mechanism to be set forth hereinafter. The body 10 is provided with a smoothly machined bore 16 which is perpendicular to and intersects the aligned passages 12 and 14. At the bottom portion of the body, and in alignment with the bore 16, there is provided a removable drain plug and clean out plug 18 whereby access may be obtained to the bore 16 from the lower end thereof.

The passages 12 and 14, where they intersect the bore 16 are provided with annular grooves or shouldered recesses 19 and 20 which are adapted to receive valve seat disks 22, each being provided with an aperture 24 constituting the valve passageway therethrough. As shown, these seats are preferably disposed at a slight inclination to the vertical, that is with their bottom portions slightly closer together than their upper portions to thus provide downwardly converging valve seats which are flush with the lower end of the bore 16.

The upper part of the valve body 10 is provided with an annular flange 26 to which is secured the corresponding flange 28 of a bonnet member 30, a stuffing box plate 32 being interposed between the flanges and provided with the usual gaskets, the flanges and stuffing box plate being removably secured together in assembled relation as by fastening bolts 34.

Either or both sides of the bonnet 30 are provided with removable covers 36 detachably secured as by screws or the like 38, which covers give access to the chamber within the bonnet.

The central portion of the stuffing box plate 32 is provided with a depending axial extension or projection 40 which is centrally apertured as at 42 to provide a journal bearing for slidably receiving the tubular valve stem 44.

Above the depending axial extension 40, the plate 32 is provided with an axial annular recess or enlargement 46 of the bore 42, which enlarged recess is adapted to receive the stuffing box packing 48 therein. The rim of the bore 46 is provided with a conical vertical extension which serves to axially elongate the stuffing box packing bore 46.

Detachably secured to the bottom surface of the axial extension 40, as by fastening screws 52, is a conical sleeve 54 which snugly and slidingly embraces the valve stem 44, the conical apex of this sleeve constituting a scraper for scraping and removing rust or other obstructions from the valve stem 44 during the vertical sliding movement of the valve stem through the stuffing box plate.

Within the bonnet 30 there is provided a packing ring indicated by the numeral 56 having a packing ring flange 58 extending horizontally and laterally from one end of the packing ring sleeve 60, whose bevelled lower end is loosely and slidingly received within the stuffing box bore 46 for compressing the packing 48 therein, and which slidingly engages the valve stem.

As will be readily apparent from Figures 2 and 3, the axial bore through the packing ring 56 is preferably of a conical shape as indicated at 62, with its smallest diameter being disposed at the lower end where the latter slidingly engages the valve stem, whereby the upper end of the conical bore which is the larger diameter of the same provides a clearance with the valve stem for a purpose to be subsequently set forth.

In order to adjust the packing ring to vary compression of the packing 48, there are provided two or more adjusting screws 64 which extend through suitable bores in the closed top wall 66 of the bonnet 30, and which at their lower ends engage anti-friction members, such as balls 68 which are seated between complementary concave surfaces in the lower ends of the fastening screws 64 and in the top surface of the flange 58 of the packing ring 56.

The fastening screws in turn extend through stuffing boxes 70 in the top wall 66 of the bonnet, and packing glands 72 are provided for securing this stuffing box. It is preferred to form the bores through the top wall 66 of the bonnet through which the adjusting screws 64 pass of a decidedly exaggerated clearance, as for example, by forming these bores of a conical shape or if preferred of an oval cross-section whereby a slight lateral movement of the adjusting screws 64 therein may be provided. This arrangement facilitates moving of the adjusting screws in order to properly adjust and compress the packing 48 in the stuffing box bore 46.

An actuator is provided for causing longitudinal rectilinear reciprocation of the valve stem 44. This actuator comprises a shaft or rod 74 having a hand wheel 76 thereon for manipulating the same, this rod being externally screw threaded as at 78 upon its lower portion and being provided with an annular enlargement or collar 80 upon its mid-portion. This rod extends through a suitable axial bore in the upper wall 66 of the bonnet, with the collar being received between anti-friction bearing assemblies 82 and 84 which are seated in a bearing chamber or recess 86 formed in the top wall 66 of the bonnet and constituting a diametrical enlargement of the bore through which the shaft 74 extends. A closure plate or cap 88 is provided having a depending annular bearing race 90 thereon for engaging the uppermost anti-friction bearing assembly 84, this plate being removably seated in a recess or chamber formed in the top surface of the top wall 66 of the bonnet.

Figure 4:
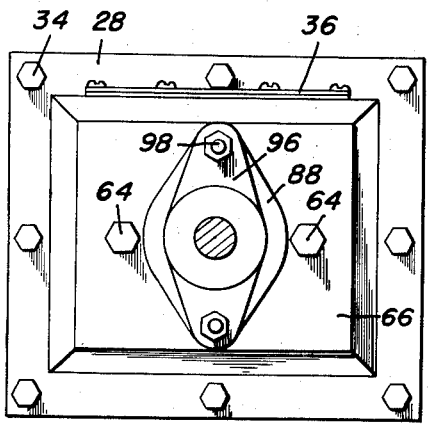

A packing member 94 rests upon the closure member 88 and engages the shaft 74 for establishing a sealing packing therewith, the packing being retained in place by a plate 96, which as shown in Figure 4 is detachably secured to the upper surface of the bonnet as by fastening screws, bolts or studs 98.

As so far described, it will now be seen that the actuating means is mounted in and journaled in the bonnet in such a manner that the same may freely rotate but is prevented from axial movement with respect to the bonnet, while anti-friction bearing means rotatably journal the shaft and retaining and sealing and packing means are provided therefor.

The access plate or plates 36 provide access to the chamber in the interior of the bonnet, thereby facilitating the adjustment, inspection or servicing of the packing ring 56 and the replacement of the packing 48 in this chamber.

It is contemplated that the bonnet shall be at all times during operation filled with lubricant, and for this purpose a lubricating inlet or admission passage 100 is provided which as illustrated is closed as by a plug 102. At the lower end of the bonnet, a similar passage is provided with a drain plug 104. By this means, lubricant may be supplied to the chamber within the bonnet or withdrawn therefrom when servicing of the packing assembly is required. It will of course be understood that lubricant may be supplied manually, or by suitable pressure means, or if desired a circulating system could be maintained through the chamber within the bonnet. However, inasmuch as the particular lubricating system does not in itself form a part of the present invention, the somewhat diagrammatic showing of the lubricating means is considered to be sufficient for purposes of this invention.

Figure 2:
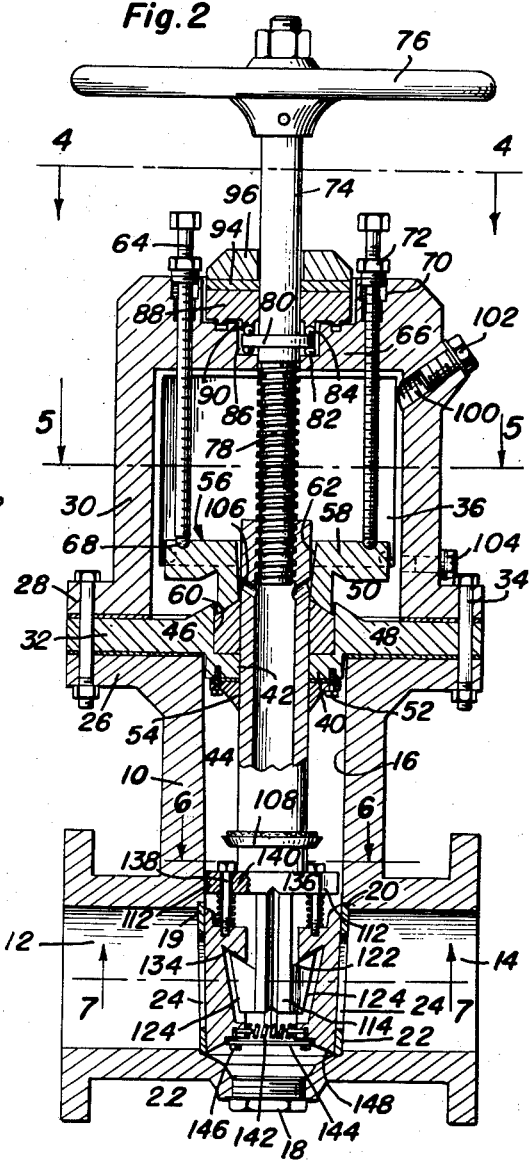
Figure 2 is a vertical central sectional view, taken upon an enlarged scale, of the valve of Figure 1, the parts of the valve assembly being shown in the position assumed when the valve is in its closed position.
Figure 3:
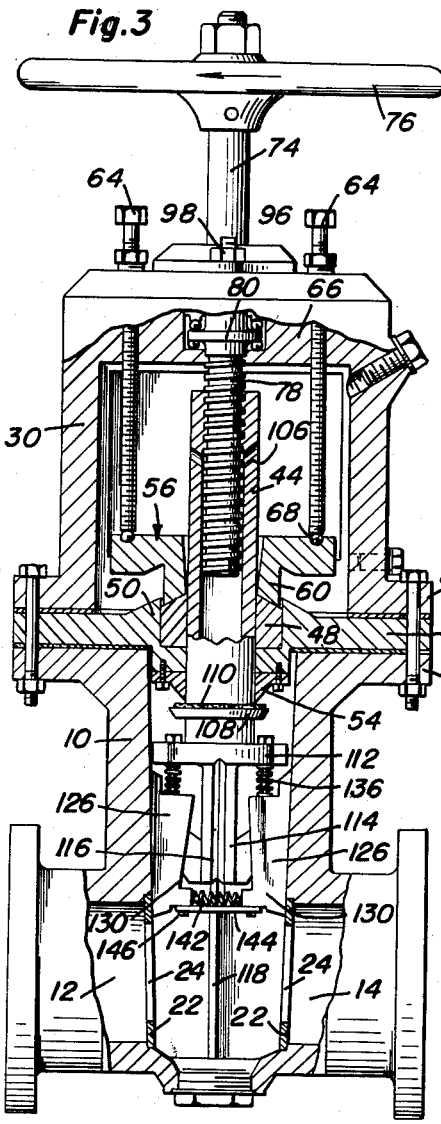
Figure 3 is a view similar to Figure 2 but showing the positions assumed by the parts when the valve is in its open position.
Figure 5:
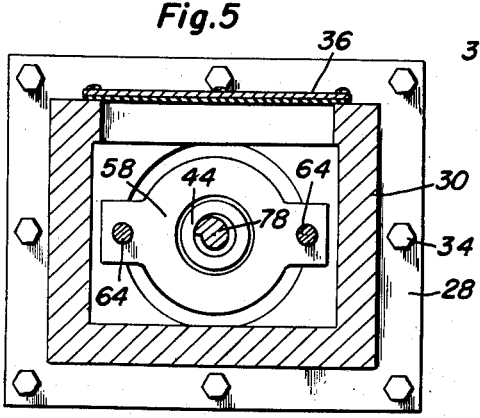

Referring more particularly to Figures 2 and 3, it will be seen that the upper portion of the tubular valve stem is open and is internally threaded to receive the threaded portions 78 of the valve actuating shaft 74. It should be observed that the portion in the interior of the tubular stem which is internally threaded, is of less internal diameter than the rest of the stem, so that when the screw threaded portion is moved downwardly within the stem from the position shown in Figure 2 to the position shown in Figure 3, a passage means will be provided between the shaft 74 and the internal surface of the tubular stem 44. This passage or clearance is utilized for the passage of lubricant and a lubricant inlet and escape is provided in the upper end of the tubular stem which in the closed position of the valve lies within the previously mentioned conical space between the bore 62 of the packing ring 56 and the external surface of the valve stem. Thus, in a closed position of the valve, lubricant may flow from the chamber within the bonnet, through the above mentioned conical space, through the passage 106 and into the interior of the valve stem 44 when the valve is in a closed position of Figure 2; and may flow in the reverse manner as the threaded end of the shaft 74 is forced into the interior of the stem 44, thus permitting lubricant to escape from the interior of the valve stem, as the valve is moved toward its open position shown in Figure 3.

The valve stem 44 is provided adjacent its lower end with an annular or cup-shaped member 108 which carries or is provided with a resilient or deformable annular packing ring 110. The member 108 and the packing ring 110 are adapted in the upward position of the valve to embrace and receive the conical scraper member 54 and establish a sealing engagement therewith. This construction, in the open position of the valve as shown in Figure 3, establishes an extra seal between the valve stem and the bore 42 of the stuffing box plate 32 to assist the packing member 48 of the stuffing box in preventing leakage between the chamber 16 and the chamber within the bonnet. The advantage of this construction resides in the fact that when the valve is in raised position, so that the sealing member 110 tightly embraces the scraper 54, the lubricant may be drained from the chamber within the body, the access plate or plates 36 may be removed, and the stuffing box packing may be serviced or changed without danger of leakage from the valve body.

Figure 7:
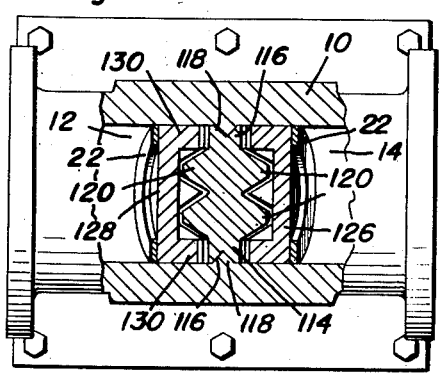
Figures 4–7 are respective detail views taken in horizontal sections substantially upon the planes indicated by the section lines 4—4, 5—5, 6—6 and 7—7 of Figure 2.

Attention is now directed to the novel and improved valve seating means forming an essential feature of this invention. The valve means is carried by the lower end of the valve stem 44. For this purpose there is provided a valve carrier which includes integral, oppositely extending lateral support projections 112, see Figure 6, at the lower end of the valve stem. These lateral projections are movable within the bore 16 of the valve body as will be evident by comparing Figures 2, 6 and 3. Below the support projections 112, the end of the valve stem 44 is provided with an axial depending extension 114. The latter, as shown more clearly in Figure 7, is provided with oppositely disposed longitudinally extending V-shaped notches 116 adapted to receive V-shaped guides 118 carried by the side walls of the valve body between the passages 12 and 14. Thus, the lower end of the valve stem carrier is guided for axial and longitudinal sliding movement in the valve body. The other opposite sides of the extension 114 are provided with laterally extending ribs 120 disposed in pairs on opposite sides of the extension. These ribs are provided with upper supporting surfaces 122 which converge inwardly and downwardly and with outer inclined surfaces 124 which are downwardly converging.

Movable valve means are mounted upon the carrier and cooperate with the valve seats. These valve means comprise a pair of valve members, each consisting of a channel-shaped plate 126, each plate having a valve seating surface 128 which is adapted to slide upon the valve seat 22 in tight sealing engagement therewith. The channel shaped plates 126 include terminal leg portions 130 which slidingly engage the adjacent surface of the side walls of the body 10 disposed between the aligned passages 12 and 14, as shown clearly in Figure 7.

Figure 6:
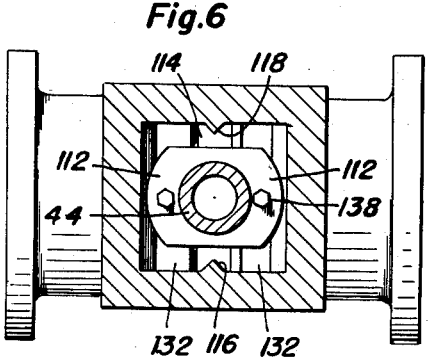

At their upper portions, the valve members 126 are provided with lateral lugs 132, see Figures 2 and 6, which extend towards the extension 114 and overlying the supporting shoulders 122 thereof. The undersurface of the lugs 132 are provided with varying surfaces which are upwardly and outwardly inclined with respect to the longitudinal axis of the valve stem. These bearing surfaces, indicated by the numeral 134, slidingly engage the supporting surfaces 122 and are movable thereon, and the inner surfaces of the valve means or members are provided with downwardly converging walls complementary to the walls 124 of the axial extension 114.

As above mentioned, the valve members are movably carried by the valve carrier. For this purpose, each member is provided with a resilient means in the form of a compression spring 136 interposed between the upper surface of the projecting lugs 132 and the undersurface of the support projections 112, these springs embracing bolts 138 which extend loosely through apertures 140 in the support projections. As will be noted, these apertures are conical in shape whereby the bolts may swivel therein to thus provide for a pivotal or swivelling movement of the valve means. The springs urge the valve members 126 axially of the valve stem and downwardly upon the support surfaces 122.

At their lower ends, the valve members are provided with a resilient means in the form of a compression spring 142 whose ends are engaged against the adjacent end portions of the valve members for urging the latter laterally away from the valve stem and resiliently into seating engagement with the valve seats 22.

A retainer plate 144 is provided having elongated slots at its ends for receiving fastening bolts 146 whereby the plate is secured at the lower ends of the valve members to limit outward movement of the same with respect to each other.

At the lowermost ends, the valve members are provided with bevel scraper edges 148 which are adapted to scrape against the valve seat members 22 for removing deposits of rust or other matter therefrom.

As described, it will now be apparent that the valve members are resiliently urged downwardly against the supporting shoulders 122 and are yieldingly urged laterally outwardly against the valve seats to effectively seal and close the same. It will also be observed in the closing movement of the valve, the resilient urging of the valve, axially downwardly of the valve stem will cause the same to resiliently and yieldingly strike and remove any deposits accumulated upon the valve seat.

As the valve is raised from its seat, into the position shown in Figure 3, it will be apparent that the valve members, having to move upwardly into the bore 16, will move laterally outwardly from each other, urged by the spring 142, in view of the increased diameter of the passage 116 with respect to that of the lower portion of the inclined valve seats 22. Thus, the valve members will be yieldingly urged against the walls of the bore 16 and upon downward movement of the valve the scraper members on the same will clean those walls, and as the valve moves downwardly into its seating members, the valve members will oscillate and be compressed towards each other, increasing the valve seating pressure, insuring cleansing of the seat and causing adjustment of the valve upon its seat.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

Having described the invention, what is claimed as new is:

1. In a sliding gate valve assembly, a valve body having valve seat means therein, a valve stem mounted in said body for longitudinal sliding movement toward and away from said seat means, valve means carried by said stem cooperating with said valve seat means, a stuffing box plate mounted on said body and having a stuffing box slidably journaling said valve stem, a scraper mounted on said stuffing box and having a blade slidably embracing said valve stem, a packing member on said stem slidably embracing said blade upon movement of said stem and valve means towards said scraper.

2. The combination of claim 1 including a scraper on said valve means slidingly engaging said valve seat means, said valve means being movably supported by said stem, resilient means engaging said valve means and yieldingly urging the latter longitudinally of said stem.

3. The combination of claim 1 including a scraper on said valve means slidingly engaging said valve seat means, said valve means being movably supported by said stem for longitudinal movement therealong, resilient means yieldingly urging said valve means laterally of said stem and towards said seat means.

4. The combination of claim 1 including a scraper on said valve means slidingly engaging said valve seat means, said valve means being movably supported by said stem, resilient means yieldingly urging said valve means laterally of said stem and towards said seat means, and resilient means engaging said valve means and yieldingly urging the latter longitudinally of said stem.

5. In a sliding gate valve assembly, a valve body having a valve seat means therein, a valve stem mounted in said body for longitudinal sliding movement toward and away from said seat means, valve means carried by said valve stem cooperating with said valve seat means, a stuffing box plate mounted on said body and having a stuffing box slidably journaling said valve stem, said stuffing box having a packing ring embracing said valve stem, a bonnet mounted on said body and forming a hollow lubricating chamber above said stuffing box and packing ring into which said valve stem extends upon longitudinal sliding movement in one direction, an actuator rotatably and non-slidably maintained in said chamber operatively engaging said valve stem.

6. In a sliding gate valve assembly, a valve body having a valve seat means therein, a valve stem mounted in said body for longitudinal sliding movement toward and away from said seat means, valve means carried by said valve stem cooperating with said valve seat means, a stuffing box plate mounted on said body and having a stuffing box slidably journaling said valve stem, said stuffing box having a packing ring embracing said valve stem, a bonnet mounted on said body and forming a hollow lubricating chamber above said stuffing box and packing ring into which said valve stem extends upon longitudinal sliding movement in one direction, an actuator rotatably and non-slidably maintained in said chamber operatively engaging said valve stem, adjusting screws carried by said bonnet and engaging said packing ring for pressing said packing ring into said stuffing box.

7. In a sliding gate valve assembly, a valve body having a valve seat means therein, a valve stem mounted in said body for longitudinal sliding movement toward and away from said seat means, valve means carried by said valve stem cooperating with said valve seat means, a stuffing box plate mounted on said body and having a stuffing box slidably journaling said valve stem, said stuffing box having a packing ring embracing said valve stem, a bonnet mounted on said body and forming a hollow lubricating chamber above said stuffing box and packing ring into which said valve stem extends upon longitudinal sliding movement in one direction, an actuator rotatably and non-slidably maintained in said chamber operatively engaging said valve stem, a scraper mounted on said stuffing box and having a blade slidably embracing said valve stem, a packing member on said stem slidably embracing said blade upon movement of said stem and valve means toward said scraper.

8. In a sliding gate valve assembly, a valve body having a valve seat means therein, a valve stem mounted in said body for longitudinal sliding movement toward and away from said seat means, valve means carried by said valve stem cooperating with said valve seat means, a stuffing box plate mounted on said body and having a stuffing box slidably journaling said valve stem, said stuffing box having a packing ring embracing said valve stem, a bonnet mounted on said stuffing box plate enclosing said stuffing box and packing ring, said bonnet and stuffing box plate forming a hollow chamber for holding lubricant, a valve actuator rotatably and non-slidably carried by said bonnet and extending into said chamber operatively engaging said valve stem for moving the same into and out of said chamber.

References Cited in the file of this patent

UNITED STATES PATENTS

| | | |
|---|---|---|
| 623,194 | Vollmann | Apr. 18, 1899 |
| 744,214 | Lowe | Nov. 17, 1903 |
| 856,546 | Pfeil | June 11, 1907 |
| 948,404 | Webb | Feb. 8, 1910 |
| 1,492,234 | Arnold | Apr. 24, 1924 |
| 1,783,329 | Edmonds | Dec. 2, 1930 |
| 1,788,000 | Sparks | Jan. 6, 1931 |
| 1,995,395 | Mohr | Mar. 26, 1935 |
| 2,064,567 | Riley | Dec. 15, 1936 |
| 2,258,230 | Warren | Oct. 7, 1941 |
| 2,306,490 | Noole | Dec. 29, 1942 |
| 2,395,212 | Blanchard | Feb. 19, 1946 |
| 2,449,790 | Sebald | Sept. 21, 1948 |

FOREIGN PATENTS

| | | |
|---|---|---|
| 392,649 | Great Britain | of 1933 |